Jan. 31, 1950 R. N. WARD ET AL 2,495,994
UPRIGHT FOLDING MACHINE
Filed Nov. 11, 1944 8 Sheets-Sheet 4

INVENTORS
ROBERT N. WARD
WILLIAM H. MATTHEWS
BY
Toulmin & Toulmin
ATTORNEYS

Patented Jan. 31, 1950

2,495,994

UNITED STATES PATENT OFFICE 2,495,994

UPRIGHT FOLDING MACHINE

Robert N. Ward and William H. Matthews, Dayton, Ohio, assignors to The Egry Register Company, Dayton, Ohio, a corporation of Ohio Application November 11, 1944, Serial No. 562,992

4 Claims. (Cl. 270—79)

This invention relates to machines for aligning and folding continuous webs of material into a fan-folded pack. In this type of machine webs are drawn from a plurality of rolls or other sources, superposed with the edges of all webs in desired relation transversely, transversely creased at predetermined longitudinally-spaced hinge sections, with adjacent hinge sections reversely creased, and folded into packs whose opposed edges are formed by the aforesaid hinged sections. These packs while useful in numerous ways, are intended more particularly for employment in autographic registers, and in a typical form, consist of consecutive printed forms having weakened tear lines at the aforesaid hinge sections whereby one set of superposed forms are detached after a sale has been recorded thereon.

It is an object of our invention to provide in a machine as aforesaid, in combination with a creasing mechanism, a simplified and improved stacking means for the creased sections, whereby to form a pack, together with means for guiding and depositing the pack onto a conveyor.

Another object is to provide a combination of creasing mechanism, folder, and conveyor, all driven in timed relation from interconnected power connections, together with guide plates for conducting the folded webs from the folding means onto the conveyor.

A further object is to provide improved easily-adjustable means whereby the creasing means may be quickly adapted for different conditions of use as, for example, a different number of webs, different weight of paper, or other material.

Another object is to provide an improved resilient latch means for the creasing mechanism which may be quickly disconnected for threading the machine and which, when connected yieldingly holds the two sections of the creaser together whereby smooth and accurate operation is assured over a wide variety of conditions of use.

Another object of our invention is to provide a creasing and folding machine, as aforesaid, wherein the webs move in a generally horizontal direction to thus facilitate operation and adjustment.

A further object is to provide individual pairs of gripper rolls for feeding the respective webs into the machine, together with individual, adjustable tensioning means whereby each web is given exactly the proper tension to produce smooth, perfectly-formed packs.

A still further object is to provide, in combination with a creasing mechanism, a novel folding means wherein alternate hinge sections are folded, superposed and separately and individually moved until deposited upon a conveyor or other receptacle.

Other objects and advantages of our invention will become apparent as the description proceeds.

General construction

Figure 3:
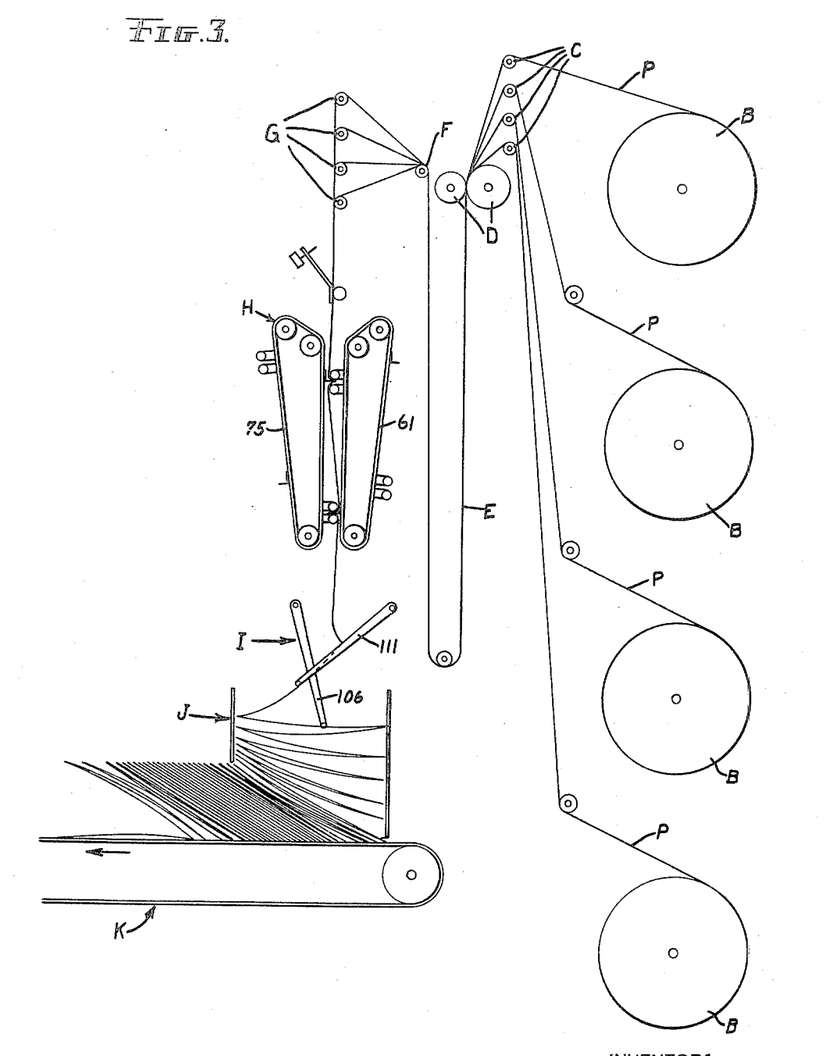
Figure 3 is a view illustrating diagrammatically the several supply rolls and the manner in which webs are drawn therefrom, superposed, creased, folded and guided in stacked condition onto a conveyor.

Figure 3 shows diagrammatically the essential parts of our machine, wherein B designates the paper web supply rolls, shown as four in number; C, designates web guide rolls; D, gripper or web feed rolls; E, free paper web loop; F, lateral web aligning and guide; G, web separator rolls; H, web hinge aligning and creasing mechanism; I, fan-folding web-stacking means; and J, conveyor.

The web supply rolls B are pivotally mounted one above the other by a frame, subsequently described. Paper webs P are drawn therefrom to guide rolls C from whence they pass, in superposed condition between knurled gripper or web-feed rolls D. Thereafter, the superposed webs pass downwardly in a free loop E and again upwardly to and over a roll F whose purpose is to accurately align the webs so that their edges coincide. From roll F, the webs are separated and pass over individual separator rolls G. The purpose of separator rolls G is to introduce air between the webs whereby they may be subsequently easily moved relatively to each other. After leaving rolls G, the webs are again superposed before passing to web hinge aligning and creasing mechanism H. The purpose of this mechanism is to reversely crease the webs at spaced intervals which may coincide with weakened hinge portions or perforated tear lines. After creasing, the webs pass to folding and stacking mechanism I where the consecutive sections between creases are fan-folded and stacked between guide plates J, and delivered to conveyor K.

Figure 2:
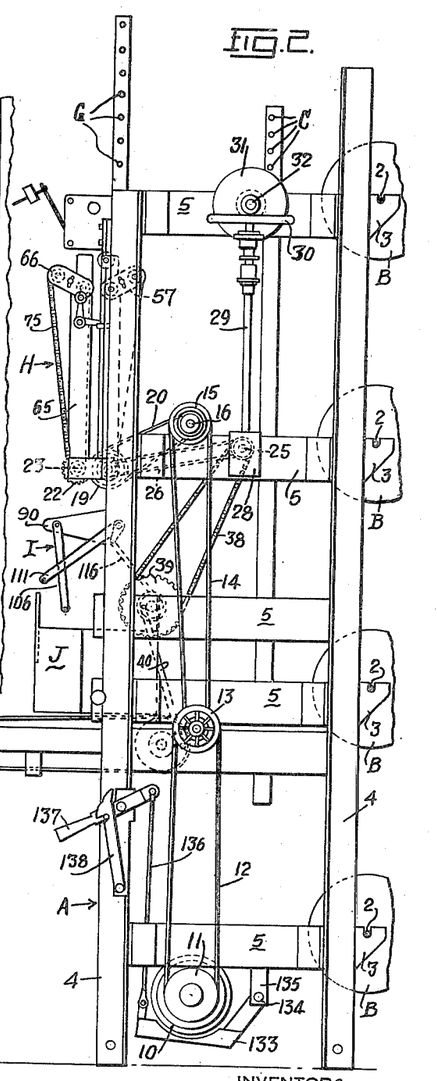
Figure 2 is an elevation from the right hand side of the machine shown in Figure 1.

The frame A consists generally of four upright supports 4 interconnected by cross members 5. The web supply rolls B, as shown at Figure 2, are carried by axles 2 mounted in slots in brackets 3 secured to the two rear upright frame members 4. Conveyor K is supported at its forward end by parallel bracket members 47 secured to forward uprights 4 at one end and carried on legs 48 at the other end.

Power train

Figures 4, 11, 12:
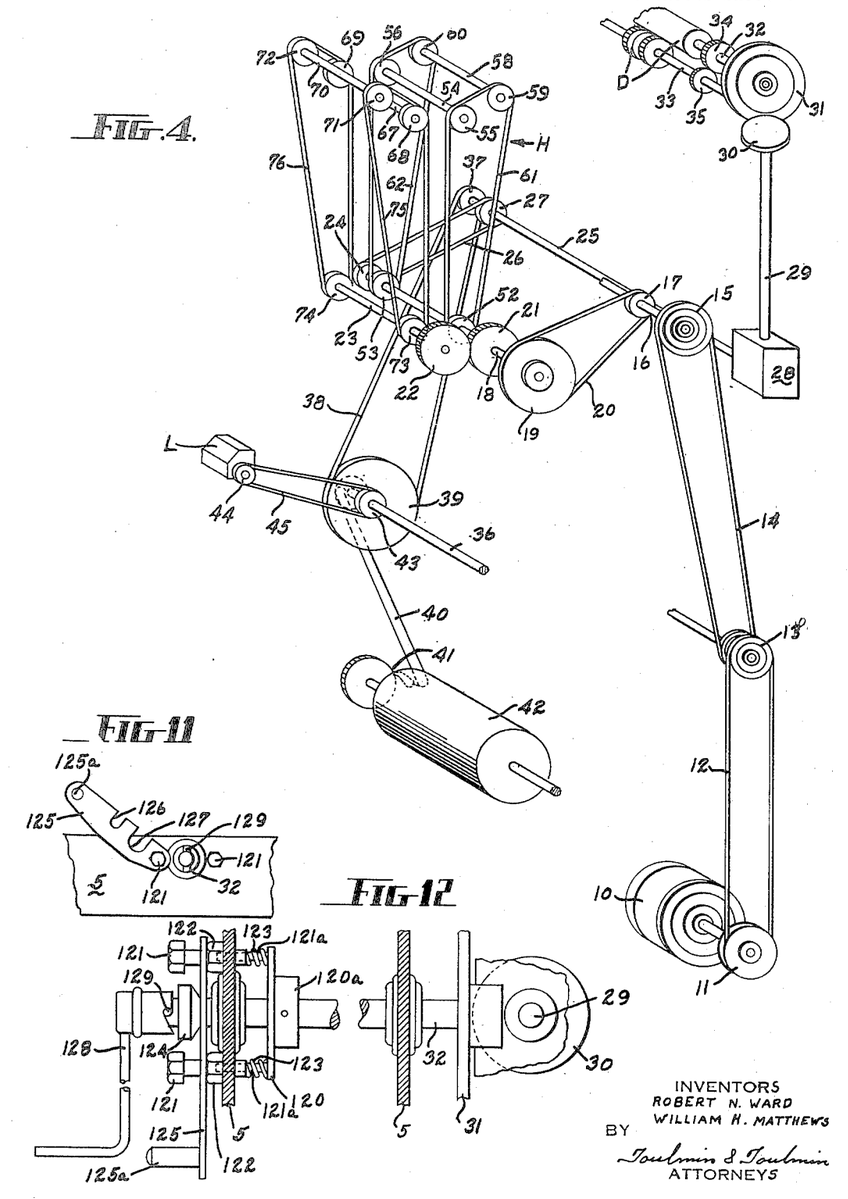
Figure 4 is a diagrammatic view showing the power connections from a single prime mover to the various driven parts of the machine whereby said parts are interconnected for correctly timed conjoint operation.
Figures 11 and 12 are detail views of the means for disconnecting the power drive to the web-feeding and gripper rolls whereby said rolls may be manually adjusted for initially threading the machine.

Referring to Figures 2 and 4, a driving motor 10 has a pulley 11 fixed to its shaft and over which a belt 12 passes. This belt drives a double pulley 13 which, in turn, operates a belt 14 to drive a similar pulley 15. Pulley 15 is fixed to the same shaft 16 as a driving pulley 17 which drives a shaft 18 by means of a pulley 19 and belt 20. A gear 21 is attached to shaft 18 and meshes with another gear 22 fixed to a shaft 23. Shafts 18 and 23 drive the aligning and creasing mechanism H.

Shaft 18 carries a sprocket 24 which drives a shaft 25 by means of a chain 26 and sprocket 27. Shaft 25 extends into a box 28 housing reduction gears and connecting said shaft to a second shaft 29 operating a friction wheel 30 of a variable speed drive wherein said wheel may be adjusted radially over a disc 31. This disc is fixed on a shaft 32. There is a parallel shaft 33 closely adjacent shaft 32 and the two are connected for simultaneous rotation by means of gears 34 and 35. Gripper or feed rolls D are mounted upon, and driven by, shafts 32 and 33.

A shaft 36 is mounted parallel to shaft 25 and is connected to be driven by said shaft by sprocket 37, chain 38 and sprocket 39. This sprocket drives the belt of conveyor K by means of a pitman 40 and ratchet and pawl mechanism 41, subsequently described. One roller of conveyor K is indicated at 42, Figure 4. If desired, a counter L may be actuated from shaft 36 by sprockets 43, 44 and chain 45, as will be obvious from inspection of Figure 4.

Aligning and creasing mechanism

One form of web that the machine is adapted to handle, consists in printed forms uniformly spaced and separated at weakened tear, or hinge lines, formed by transverse rows of perforations, for example. As the distance between hinge lines may vary slightly, it is necessary to first align the hinge lines of the superposed webs prior to creasing them so that all corresponding form sections of the respective webs will be exactly superposed and aligned.

Figures 5, 6:
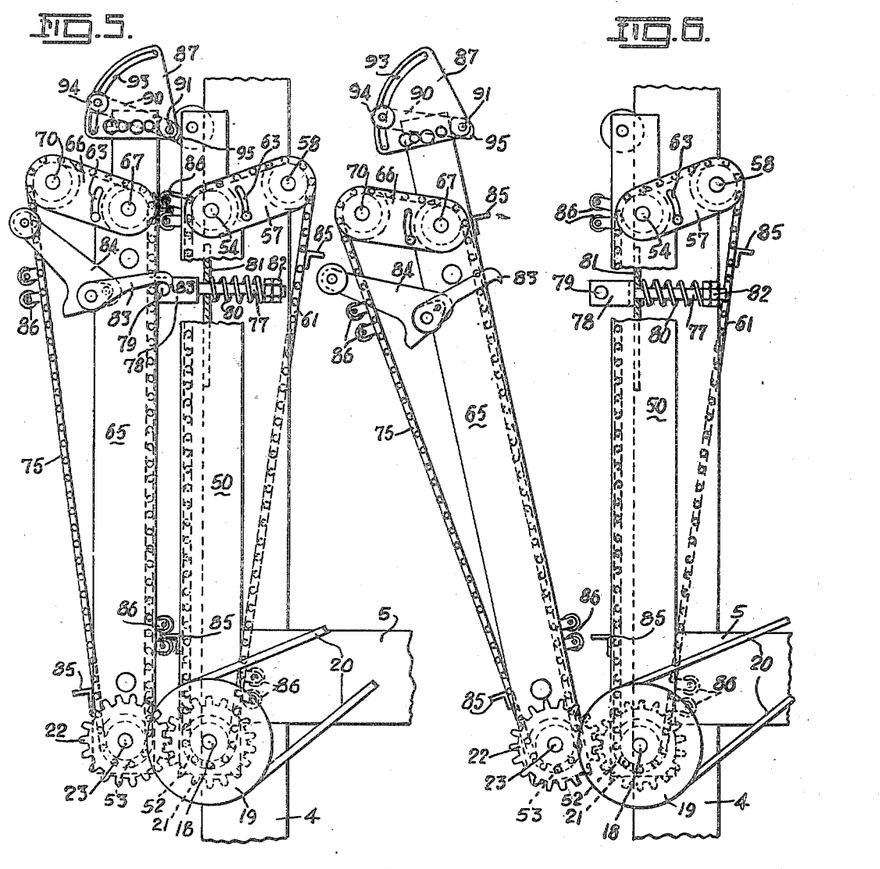
Figure 5 is a side elevation, with parts broken away, of a creasing mechanism provided with our section-spacing device and yielding latch connection and showing the two sections in closed or operating position.
Figure 6 is a view similar to Figure 5 but showing the sections in open relation for threading the superposed webs therethrough.

This aligning mechanism, generally indicated at H, Figures 2 to 6, inclusive, is shown in detail upon Figures 4, 5, and 6. Shaft 18 driven in a manner previously described, is journaled in bearings carried at the lower end of a pair of plates 50, fixed to brackets 51. These brackets 51 are carried by forward supports 4. A pair of sprocket wheels 52 and 53 are fixed to shaft 18, in spaced relation thereon. Adjacent their upper ends plates 50 rotatably support a shaft 54 to which are fixed chain guide rollers 55 and 56. Short bracket arms 57 are pivoted coaxially of shaft 54 and, at their outer ends, provide bearings for a shaft 58. This shaft carries sprockets 59 and 60. As will be clear from inspection of Figure 4, a chain 61 passes around and connects sprocket 52, roller 55 and sprocket 59. In a similar manner, a chain 62 passes around and connects sprocket 53, roller 56 and sprocket 60. Bracket arms 57 are pivoted on an axis coincident with the axis of shaft 54 and are provided with any convenient securing means such as a set screw passing through a slot 63 in said arms. By this construction arms 57 may be secured in pivotally adjusted positions to tighten chains 61 and 62 as desired.

Short arms 64 (Figures 8 and 9), project forwardly from respective plates 50 and pivotally mount a shaft 23 and a pair of plates 65 held in fixed spaced relation. These plates, which are similar to plates 50, carry arms 66 and a shaft 67 on which are mounted chain guide rollers 68 and 69. A shaft 70, corresponding to shaft 58, is journaled by the free ends of arms 66 and carries chain guide rollers 71 and 72. Sprocket wheels 73 and 74 are fixed on shaft 23, and it will be clear from Figure 4, that a chain 75 passes over, and is guided by sprocket 73, and rollers 68 and 71, while a second chain 76 passes over, and is guided by sprocket 74 and rollers 69 and 72.

It has previously been explained that shafts 18 and 23 are connected for synchronous rotation by gears 21 and 22. The arrangement is such that chains 61 and 75 are coplanar. Chains 62 and 76 are likewise coplanar. In normal operating position, shown at Figures 2, 4, 5, 8, and 9, adjacent passes of the chains are parallel and, by the connections described, are driven synchronously downward. Arms 66 are pivotally adjustable for tightening the chains 75 and 76 in the same manner as has been described for arms 57.

As shown at Figure 6, plates 65, and the shafts and chains carried thereby, may be swung outwardly away from plates 50 to facilitate threading of the webs into the machine. A rod 77 (Figures 5 and 6), is slidably mounted within an apertured bracket 81, adjacent the outside of each plate 50. Each rod has a head 78 fixed thereon bearing a pin 79; and is resiliently urged into position such that its head is in contact with its bracket 81, as seen at Figure 6, by a compression spring 80 surrounding rod 77 and acting between the side of bracket 81 opposite head 78 and nuts 82 threaded on rod 77.

A lever 83 is pivoted on each plate 65 in such position that a hooked end thereon may engage over a respective pin 79, whereby springs 80 act to yieldingly hold the adjacent passes of chain in operating relation. An operating handle 84 is provided for, and so connected to each lever 83 as to unhook the same from pin 79 when said handle is moved outwardly toward the operator.

Each of the chains 61, 62, 75, and 76, has attached transversely thereof at predetermined spaced intervals, aligning blades 85. Midway between consecutive blades, the chains also carry pairs of spaced rollers 86. The chains are so timed that when operating, a blade on one chain enters between a pair of rollers on the other chain whereby creases in alternately opposite directions are made on the superposed webs. By reference to Figure 8, it will be noted that the rollers of each pair are mounted upon consecutive chain links. In this manner, the rollers of each pair are slightly separated as they pass about guide rollers 55, 56, 68, and 69, whereby the blade 85 just entering between them, may easily move a hinge section of the webs between rollers. Thereafter, on continued motion of the chains, the pair of rollers close over the blade and effectively crease the superposed webs. The action is smooth and continuous so that creases are formed at predetermined spaced intervals along the webs with consecutive creases in alternate directions. The spacing of the alternate web-clamping rollers 86 and aligning blades 85 is a little less than the distance between the consecutive hinge sections of the webs to thereby provide sufficient slack so that the web hinges can be properly aligned without excessive stress on, and without tearing, the creased hinge sections.

Figure 7:
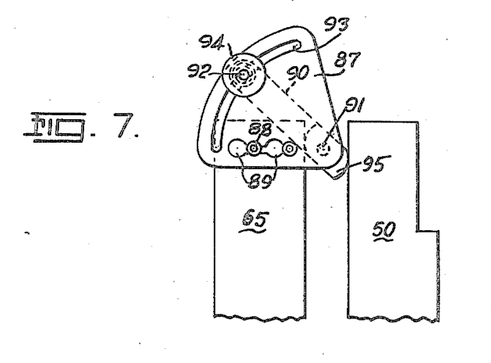
Figure 7 is an enlarged detail view of a portion of Figure 5 showing the adjustable double cam feature for determining the minimum spacing of the two creaser sections.

Depending upon the type of paper to be handled, the number of superposed webs, etc., it adds greatly to the efficient operation of our machine to be able to vary the limit to which creasing blades 85 may enter between the rollers 86. Means for effecting this function are shown at Figures 5, 6, and 7. Such means consists in a sector-shaped plate 87 that may be quickly attached to, or detached from plates 65 by means of spaced headed bolts 88 secured to the upper end of plates 65. Plate 87 has spaced holes 89 therein with slots opening into said holes. The holes are sufficiently large to enable the plate 87 to be slipped over the heads on bolts 88, after which the plate is slid between the heads and plate 65 so that the slots in said plate ride over the bolts 88. The plate 87 is thus slidably connected to plate 65. Sector plate 87 has an arm 90 pivoted thereon on axis 91. This arm has a bolt 92 at its free end, projecting through a slot 93 in plate 87, concentric of pivot axis 91. A thumbscrew 94 is threaded onto bolt 92 and acts to bind arm 90 to plate 87 in any selected position of adjustment along slot 93. If desired, there may be graduations (not shown) on plate 87 along the slot 93, to coact with a mark on arm 90 so that any desired setting of said arm may be duplicated. Arm 90 has fixed thereto symmetrically of axis 91, a double cam 95, shaped as shown in solid and dotted lines upon Figure 7. The cam is so positioned that, when plate 65 is in the position shown at Figure 7, one surface of said cam contacts an edge of plate 65 while, at the same time, the other surface of said cam contacts the adjacent edge of plate 50. By this arrangement, the separation of plates 50 and 65, when in normal operating position, as well as the maximum extent to which edges 85 may enter between rollers 86, may be precisely varied to suit various conditions of use.

Folding and stacking mechanism

Figure 1:
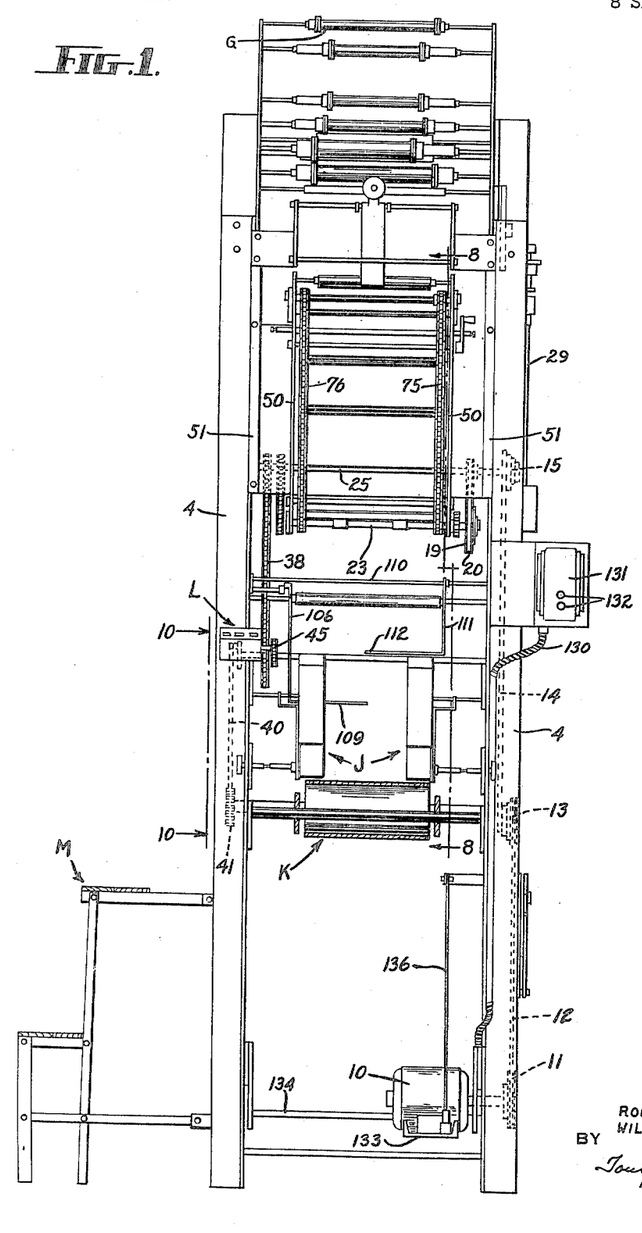
Figure 1 shows a front elevation of the upright form of machine embodying the novel features of our invention and showing the general arrangement of parts, particularly the creasing mechanism, pivoted arm folder, guide plates and conveyor.

After emerging from the web hinge aligning and creasing mechanism, the webs pass downwardly to the folding and stacking means, indicated generally at I, Figs. 2, 3, 8, and 9. As shown more particularly in the latter two figures, this mechanism is supported upon a bracket 100 carried by the left front upright 4 as viewed from the front. A rocking lever 101 is journaled upon a stub shaft 102 fixed in bracket 100 to one side of the downward path of creased webs P. This lever has pins 103 and 104 on opposite ends, said pins being equally spaced from the pivot axis defined by stub shaft 102. At its forward end, adjacent pin 103, bracket 100 supports, on pivot 105, an oscillating stacking arm 106, integral with, or fixed to, a short lever 107 having its free end slotted as at 108. Pin 103 rides in this slot. At its free end, arm 106 carries a stacking pin 109. This pin extends to approximately the center line of the downwardly moving webs, as shown at Figure 1. A shaft 110 extends across the front of the machine and is journaled at one end in bracket 100 and at the other end in an upright 4.

As viewed from the front, the shaft 110 has a stacking arm 111 fixed thereto a little beyond the right hand edge of the webs. Said arm carried a stacking pin 112 at its free end. The two pins 109 and 112 are, of course, the same distance from their respective pivot axes. At its left hand end, shaft 110 has a short arm 113 fixed thereto. Said arm has a radial slot 114 within which the pin 104 rides. This pin, it will be remembered is carried on one end of rocking lever 101. Another arm 115 is fixed to shaft 110 adjacent the left hand end thereof. This arm is pivoted at its end, to a pitman 116 which, as may be noted upon Figure 2, is driven from sprocket 39. The drive to this sprocket from motor 10 has been previously described.

Figure 8:
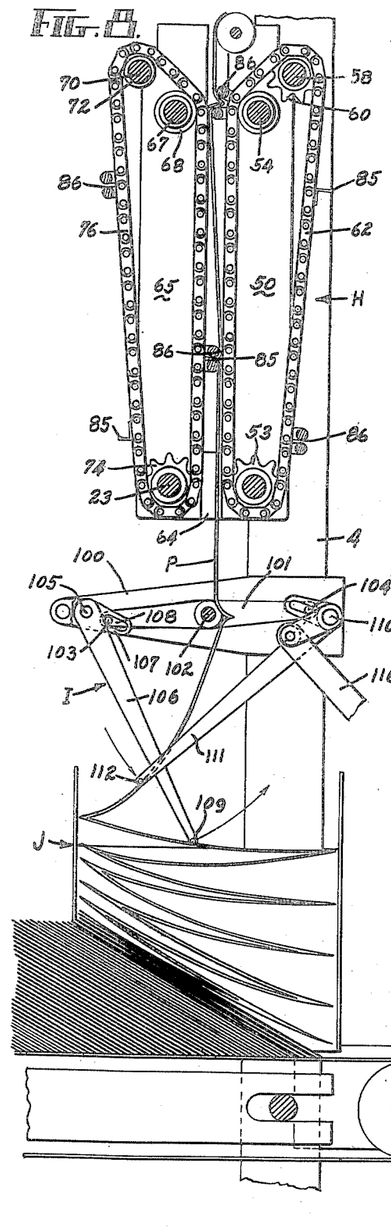
Figure 8 is a section on line 8—8, of Figure 1, showing the creasing mechanism, oscillating arm folder, guides plates and conveyor with webs passing therethrough and formed into a stack.
Figure 9:
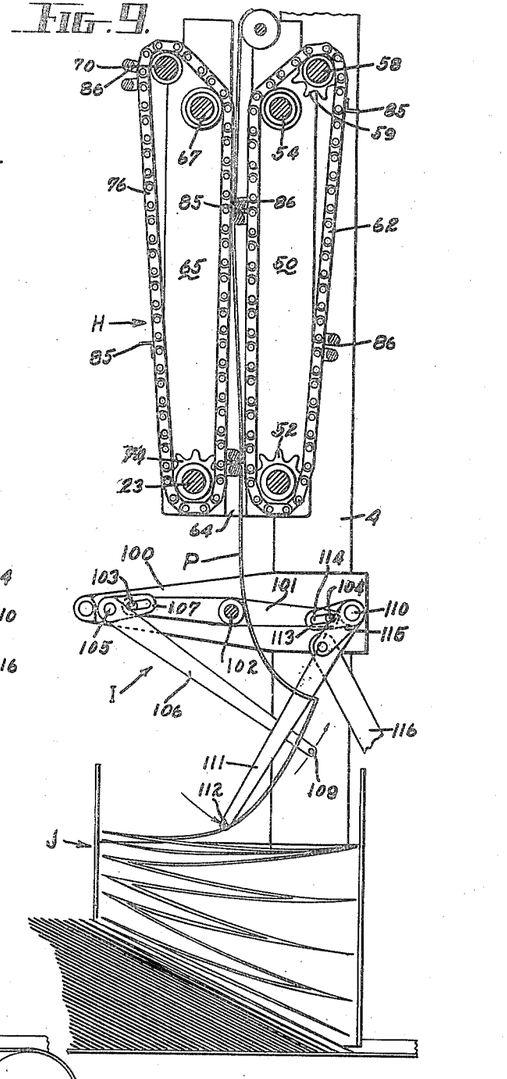
Figure 9 is a view similar to Figure 8 showing the folder arms in positions subsequent to those occupied in Figure 8.

From the foregoing description and inspection of Figures 8 and 9, the operation of our stacker will now be clear. Pitman 116 oscillates shaft 110 to cause a corresponding oscillation of stacking arm 111 and its pin 112. At the same time, arm 106 and its pin 109 are correspondingly oscillated by reason of the rocking lever 101 and its pin and slot connections to shafts 105 and 110, previously described. The timing connections between sprocket 39 and the chains of creaser H are such that each stacker arm oscillates twice for each complete circuit of the chains in the particular arrangement shown. Thus, as the web moves downwardly in creased sections, each section is contacted by an appropriate one of the oscillating pins 109 or 112, and positively moved downwardly between stacking plates J in its proper relation. In Figure 8, pin 109 has just moved a section into proper position and has started its return movement in the direction of its arrow. In the same figure, pin 112 on arm 111 has just engaged the consecutive section and is moving it downwardly in proper folded position between stacking plates. Figure 9 shows the position of the arms a short interval later, wherein pin 112 has about completed its stacking movement. Pin 109 will continue to move upwardly in the direction of its arrow until it clears the crease shown closely adjacent. Thereafter, it will begin its downward movement to fold the section between said crease and the one that is about to leave the creaser, while arm 111 and its pin 112 will start a counterclockwise oscillation ready to fold the section shown between the creasing chains. The forward stacking plates J are shown with their lower edge spaced from the surface of the conveyor belt. The consecutive folds are deposited upon the conveyor in inclined position as shown at Figures 3, 8, and 9, and pass beneath the forward stacker plates J after which they are removed from the machine in packs as desired.

The conveyor

Figure 10:
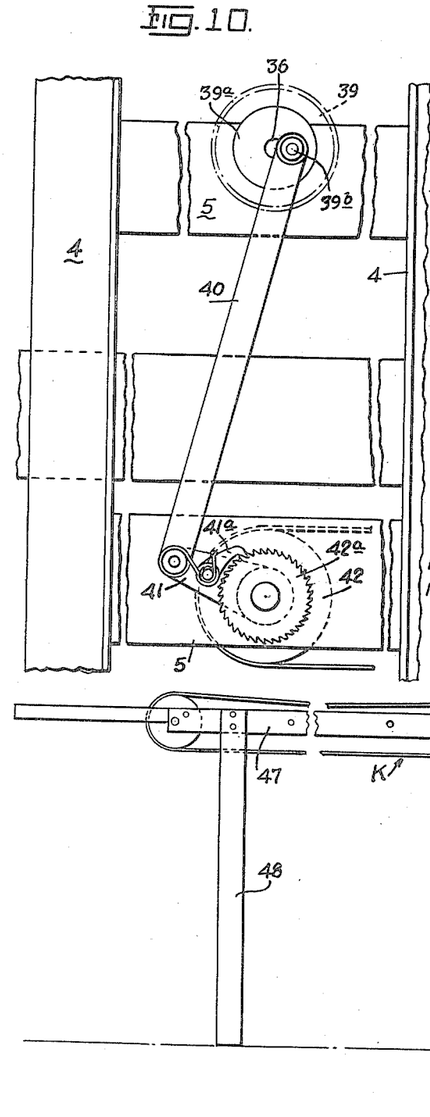
Figure 10 is a view taken substantially on the line 10—10 of Figure 1 showing the ratchet drive for the conveyor belt.

Reference to Figures 2, 4, and 10 is now made. Pitman 40, driven from sprocket 39, has been described. This pitman is driven from a plate member 39a attached to the shaft 36. Said plate member carries a pin 39b eccentric to shaft 36 and upon which one end of pitman 40 is pivoted. The other end of the pitman 40 is pivoted to a conventional arm 41 carrying spring pressed pawl 41a operating over a ratchet-wheel 42a connected to rear conveyor roll 42. By this arrangement, roll 42 drives the belt of conveyor K, step-by-step, and at the proper rate to remove the fan-folded webs as they are deposited thereon from stacking plates J. Shaft 36 is journaled in a pair of the cross members 5 extending between corresponding front and rear uprights 4.

The variable speed drive release

Referring to Figures 2, 4, 11, and 12, the shaft 32 has previously been described as carrying one of gripper rolls D and friction disc 31. A pressure plate 120 is pinned to shaft 32 by means of a collar 120a. Cap screws 121 having reduced ends 121a, are threaded through a cross member 5 and held in position by lock nuts 122. A compression spring 123 is mounted upon the reduced shank of each cap screw and bears against plate 120. As shaft 32 is mounted for slight axial movement relatively to its bearings, spring 123 acts to urge disc 31 into driving engagement with friction wheel 30. In order to initially thread the webs into the machine, prior to the starting of motor 10, it is necessary to move disc 31 out of contact with wheel 30 in order that shaft 32 and gripper rolls D may be manually turned. This function is effected by fixing a collar 124, with a frusto-conical surface, to shaft 32. A release lever 125 with handle 125a, has slots 126 and 127, Figure 11, and has its end opposite handle 125a, pivoted upon one of the screws 121. Slot 127 is substantially the same width as the smaller diameter of the frusto-conical surface of collar 124. Slot 127 is adapted to ride over the other cap screw 121 and limit rotation of lever 125. Normally, when disc 31 is in contact with wheel 30, the larger diameter of said frusto-conical surface is in the plane of movement of lever 125. As said lever is swung, the edges of slot 127 ride up on said surface and axially shift shaft 32 to thereby move disc 31 out of contact with wheel 30, against the action of springs 123. Thereafter a handle 128, shaped to slip over the end of shaft 32 and grip a pin 129 therein, is turned to manually turn the gripper rolls and initially feed the webs into the machine to the desired extent.

Motor control

As seen in Figure 1, the circuit to drive motor 10, passes through B-X cable 130 to a switch box 131 mounted on a plate attached to an upright 4 in a position convenient to the operator. The circuit is closed and opened by push buttons 132. In order that the motor 10 may be started prior to being put under load, said motor is mounted upon a platform 133 (see Figure 2), pivoted on shaft 134 to a bracket 135 attached to a member 5. At its other end, platform 133 is supported by a rod 136 pivoted at its lower end to a hand lever 137. This lever is provided with a catch 138 whereby it may be held in the position shown at Figure 2, in which position, belt 12 is loose upon pulley 11. On release of catch 138, lever 137 may be allowed to pivot under the weight of motor 10 to gradually tighten belt 12 about pulley 11 and smoothly start the machine.

Operation

The operation of this form of the invention will be clear from the foregoing description and may be briefly summarized as follows: Lever 125 is moved into position as shown at Figure 12 to move disc 31 out of contact with wheel 30. The webs are drawn off from rolls B, passed over their respective guide rollers C, and the superposed webs passed between gripper rolls D by manual actuation of crank 128. This crank is then turned to feed the webs as they are threaded into loop E, over guide roll F, separator rolls G and into the creaser H where after separation of plates 65 from plates 50, as shown at Figure 6, it is made certain that the hinge lines of all webs are superposed and are engaged by the proper one of aligning blades 85 just entering between rolls 86. Plates 65 are then closed over the webs until the hooked end of lever 83 engages over pin 79. The motor is then started by operation of push buttons 132, catch 138 is released and lever 136 lowered slowly to start the machine. After it is noted that the webs are being properly creased, folded, and passed to the conveyor, lever 137 is released and the machine allowed to operate at full speed. A bench means M for the operator, is located at the left hand side of the machine, as seen in Figure 1.

Horizontal modification—general description

Figure 13:
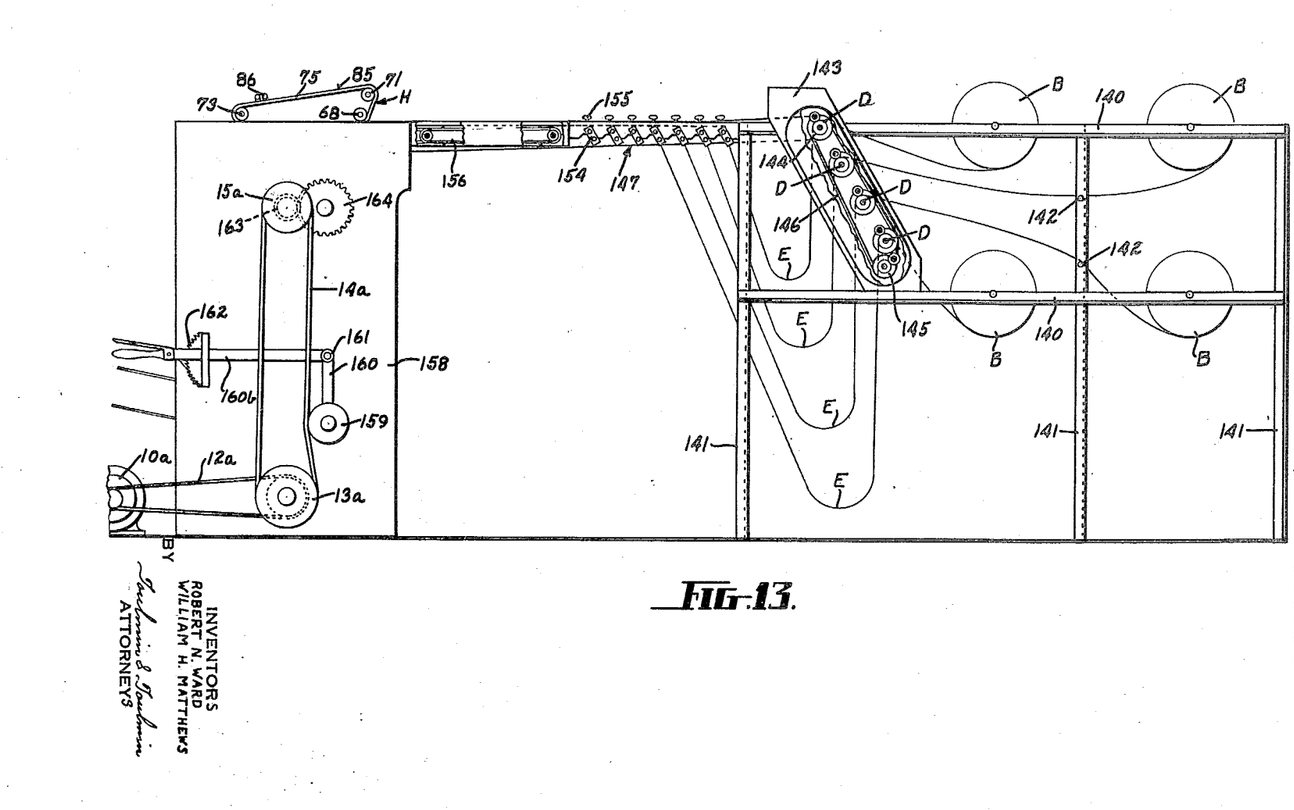
Figure 13 is a side elevation of a form of our invention wherein the webs pass in a generally horizontal direction, parts being broken away to show the web-aligning belt means.

In Figures 13 to 15, we have shown a second form of machine in which the webs are fed in from rolls to creaser, in a generally horizontal direction, then moved downwardly through a stacking device to a conveyor. Referring to Figure 13, web supply rolls B are rotatably supported as shown, upon horizontal bars 140 carried by uprights 141. From these rolls, the webs pass over guide rolls 142 (in the case of the two supply rolls at the right of Figure 12), to and between individual pairs of gripper or web feed rolls D similar in purpose and function to the corresponding rolls of the machine of Figures 1 to 11. These rolls are mounted within a common supporting means 143 carried by bars 140, on individual shafts each of which has a sprocket 144 fixed thereto. A driving sprocket 145 is located adjacent the sprocket of the lowermost pair of gripper rolls D. All sprockets are in a common vertical plane and a chain 146 connects them for synchronous rotation. A suitable variable-speed drive, not shown, leads from motor 10a to sprocket 145.

Figure 14:
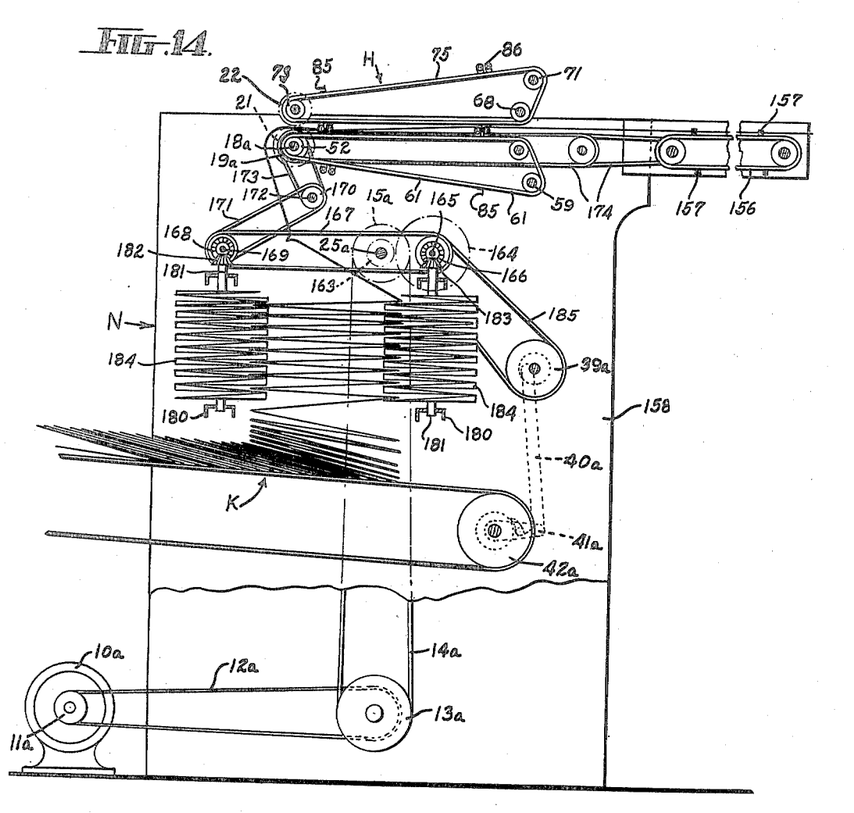
Figure 14 is an enlarged detail, partly in section, of the left-hand portion of Figure 13, showing the creasing mechanism, helical folder, conveyor, and power drive connections thereto.
Figure 15:
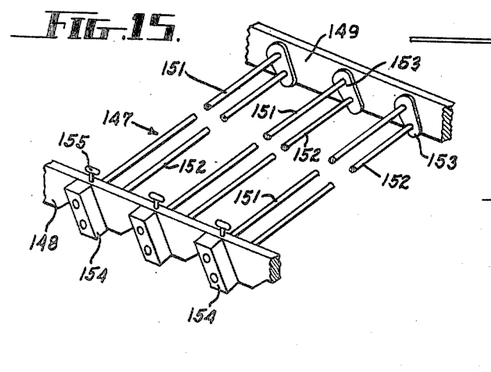
Figure 15 is a perspective view of the individual web-tensioning means used in the machine of Figure 13.
Figure 16:
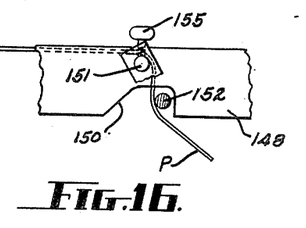
Figure 16 is a detail view partly in section, of one of the tensioning means of Figure 15.

After passing between its pair of gripper rolls, each web passes downwardly in a free loop E and thence upwardly between individual tensioning and guiding devices 147, shown in detail at Figures 14 and 15. These tensioning devices are mounted upon side plates 148, 149, forming a part of the frame of the machine and, as seen in Figure 15, plate 148 is cut away, as at 150 to form a plurality of spaced notches, each adjacent a respective tensioning device 147. Each said device comprises a rod 151 pivotally mounted between plates 148, 149, and a second rod 152 that is connected to, and in parallel relation with rod 151, by spacers 153 adjacent plate 149, and spacers 154 adjacent and at the outer side of plate 148. Each rod 152 passes through a corresponding notch in plate 148. By this construction, each rod 152 may be adjusted in a limited arc about its mate 151 as an axis and may be held in adjusted position by means of a set screw 155 threaded into a tapped hole in plate 148 and engaging its rod 151. From Figure 15, it will be noted that each web passes beneath rod 152, then upwardly over rod 151. Spacers 154 are accessible from the side of the machine, and by loosening a set screw 155 and swinging rod 152 as just described, the drag or friction on each web may be varied in an exact and precise manner so that all webs are properly tensioned before being superposed.

The webs leave the tensioning and guiding devices in horizontal superposed position whence they pass to a belt conveyor, generally indicated at 156 driven by connections subsequently described at a speed synchronized with the speed at which the webs are drawn from rolls B by gripper rolls D. This conveyor carries lugs 157 at opposite sides thereof between which the edges of the webs fit to thus make certain that the superposed webs are properly aligned before passing to the creasing mechanism H.

Said creasing mechanism is substantially the same in construction as the one that has been previously described. The main difference is that the adjacent parallel passes of the creasing chains move horizontally instead of vertically as in Figures 4, 5, and 6 and corresponding parts of the mechanism are identified by the same reference numerals as were used in describing those figures. It is therefore deemed unnecessary to repeat this description.

The creasing and aligning mechanism is mounted at the top of a casing 158 forming the left hand portion of our machine, as viewed in Figures 13 and 14. After leaving mechanism H, the superposed, creased webs move downwardly into a spiral stacker N subsequently described, whence they are deposited upon a conveyor K which may be the same as the one used in the form of machine disclosed at Figures 1 to 11.

*Power drive*

A number of the parts used in the power drive of the machine disclosed in Figures 12 to 15, correspond in purpose and function to like parts used in the machine of Figures 1–11. These parts will be identified by corresponding numerals with subscript "a". The drive from motor 10a to shaft 25a may be traced by way of pulley 11a, belt 12a, idler 13a and belt 14a to a pulley 15a fixed on said shaft. As shown at Figure 13, a belt tightener is provided for belt 14a comprising an idler pulley 159 mounted upon one end of a bell-crank lever 160 pivoted at 161 to casing 158. A handle is provided at the end of the other arm 160b of bell-crank 160 and a conventional pawl and adjustment segment 162 are provided for securing the bell-crank in pivotally adjusted position. When arm 160b is in lower position, belt 14a is loose on its pulleys and no power is transmitted to the parts from motor 160b to move idler 159 inwardly and tighten belt 14a.

Shaft 25a also has a gear 163 fixed thereto meshing with a gear 164 upon a shaft 165. Shaft 165 carries a sprocket 166 and a second adjacent sprocket, mounted behind sprocket 166 as viewed in Figure 13. These sprockets are mounted to one side of the downwardly moving webs. A chain 167 connects sprocket 166 with a sprocket 168 fixed upon a shaft 169 journaled within casing 158. Shaft 169 drives the shaft 18a by way of a second sprocket thereon, not shown, chain 171, sprocket 170, on a shaft 172 carrying another sprocket not shown, which, in turn, drives a chain 173 also passing over a sprocket 19a. Sprocket 19a corresponds to sprocket 19, Figure 4, and has a gear 21 meshing with a gear 22 whereby the two creaser chains 61 and 75 are synchronously driven in the same manner as has been described in connection with Figure 4. Power driven conveyor belts 174 operate to support the webs during their passage from aligning means 156, 157 into the creasing mechanism H.

*Spiral stacker*

Two spaced pairs of superposed beams 180 are carried by the framework within casing 158. Each pair journals a respective vertical shaft 181. A bevel gear 182 is fixed to the left-hand shaft 181, as viewed at Figure 14. This gear meshes with, and is driven by, a bevel gear on shaft 169. The other shaft 181 carries a bevel gear 183 that meshes with a bevel gear on shaft 165. The chain connection 167 between shafts 165 and 169 by which these shafts are synchronously rotated, has already been described. Each of shafts 181 carries a stacking device, indicated generally at 184, and comprising a flat metal strip bent into the form of a helix. These helices are positioned relatively to each other, and to the creasing mechanism substantially as shown at Figure 13, and the parts are timed so that, at the instant a creased web joint moves adjacent a helix, the end of said helix moves over the joint to encompass the same between the convolutions thereof. Shafts 181 rotate once for every two creased sections formed by mechanism H, so that alternate hinge sections will be received between the convolutions of the respective helices and moved downwardly therebetween and be deposited upon conveyor K in form ready for packaging.

The conveyor K is driven by mechanism similar to that shown and described in connection with Figure 10. A chain 185 drives sprocket 39a from a sprocket on shaft 165. Sprocket 39a drives a pitman 40a to operate a ratchet-and-pawl device 41a and thus drive conveyor roller 42a in a step-by-step manner and at a speed properly synchronized with that of the creasing mechanism and stacker N.

*Operation*

The operation of the horizontal form of our invention will be clear from the foregoing description and may be briefly summarized as follows. Web rolls B are mounted in their respective notches in beams 140 and each web is threaded between its pair of gripper rolls D, looped downwardly at E and passed under its tension bar 152 and over bar 153. After leaving these bars the webs are superposed and properly aligned by passing between aligning means 157. Upper creaser chain 75 and its pulleys 68 and 71 are then pivoted upwardly about the axis of sprocket 73 in the manner described in connection with Figure 6. The webs are relatively adjusted longitudinally until all hinge sections are properly aligned over a blade 85 on chain 61, after which the upper chains are pivoted downwardly until a pair of rollers thereon embrace said blade and webs. The arm 160b is lowered to loosen belt 14a, the motor 19a is started, and arm 160b moved upwardly to slowly operate the machine while guiding the initial creased hinge sections into the convolutions of the helical stacker. The arm 160b is then raised to full speed operating position.

While we have described our invention in the form now preferred by us, numerous substitution and modifications will be obvious to those skilled in the art. The disclosure is therefore to be taken as illustrative only, and not in a limiting sense; and the invention covers all such substitutions and modifications as fall within the scope of the subjoined claims.

Having thus fully disclosed our invention, what we desire to claim and secure by U. S. Letters Patent is:

1. In a machine for fan-folding a continuous paper web, a creasing means comprising two frames, endless chain means on each frame, said chain means having adjacent, substantially parallel passes, alternate parallel blade and roller means on each chain means, so spaced and timed that a blade on one chain means enters between the rollers on the other chain means when moving along said parallel passes whereby the web is alternately creased in opposite directions as it moves between said passes, a pair of spaced pivoted arms positioned at opposite edges of the web and beneath said creasing means and having their free ends disposed beneath their pivots, a pin on the free end of each arm, said pins engaging opposite sides of the web, means connecting said arms for oscillation so that said pins oscillate across the path of said creased web alternately as it leaves said creasing means engaging the opposite sides of the web, alternately to thereby engage alternate creased sections and stack them in fan-folded relation.

2. In a device for fan-folding continuous webs of material, means for creasing said webs at substantially equally-spaced sections in consecutively opposite directions, and folding means positioned to receive the creased webs as they leave said creasing means, and comprising, arms positioned at opposite edges of the web and pivoted on spaced parallel axes and having free ends disposed below their pivots, a pin on the free end of each arm, said pins engaging opposite sides of the web, means connecting said arms to move said pins to and fro in the path of said creased webs alternately in timed relation with said creasing means whereby said pins engage opposite sides of the web alternately and thereby engage alternate creased sections to move them into a fan-folded pack.

3. In a web folding machine, in combination, means for supporting and guiding a plurality of webs of material into superposed position, means for creasing said superposed webs in alternately opposite directions to form sections, and means for folding said sections into a pack, said folding means comprising, a pair of arms pivoted at respectively opposite sides of the path of said creased webs, a pin on the free end of each arm, each pin projecting into the path of said creased webs, said pins engaging opposite sides of the web, and means for oscillating said arms and pins in timed relation with said creasing means so that said pins engage opposite sides of the web alternately to fold the same into a fan-folded pack.

4. In a machine for creasing and fan-folding a continuous web of material into a pack, means for transversely creasing said web at longitudinally-spaced hinge sections, consecutive creases being in opposite directions, and means for folding the creased web into a fan-folded pack comprising a pair of arms pivoted on spaced parallel axes, a pin on the free end of each arm, each pin projecting into the path of the creased web, said pins engaging opposite sides of the web, a rocking lever centrally pivoted between said arms, a pin and slot connection between the ends of said lever and said arms, respectively, whereby said arms oscillate concurrently, and means for so oscillating said arms in timed relation with said creasing means that the respective pins engage opposite sides of the web alternately between consecutive hinge sections to fold said web into a fan-folded pack.

ROBERT N. WARD.
WILLIAM H. MATTHEWS.

REFERENCES CITED

The following references are of record in the file of this patent:

UNITED STATES PATENTS

| Number | Name | Date |
|---|---|---|
| 1,326,987 | Straubel | Jan. 6, 1920 |
| 1,624,060 | Nanterme | Apr. 12, 1927 |
| 1,791,569 | Novick | Feb. 10, 1931 |
| 1,886,312 | Stanton | Nov. 1, 1932 |
| 2,016,539 | Brenn | Oct. 8, 1935 |
| 2,057,879 | Campbell | Oct. 20, 1936 |
| 2,246,336 | Wyrick | June 17, 1941 |
| 2,359,417 | Hand | Oct. 3, 1944 |

FOREIGN PATENTS

| Number | Country | Date |
|---|---|---|
| 695,736 | France | Dec. 19, 1930 |